(12) United States Patent
Ohno

(10) Patent No.: US 7,519,971 B2
(45) Date of Patent: Apr. 14, 2009

(54) DATA PROCESSING METHOD, INFORMATION PROCESSING APPARATUS, AND PROGRAM

(75) Inventor: Hajime Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 10/761,291

(22) Filed: Jan. 22, 2004

(65) Prior Publication Data

US 2004/0154025 A1   Aug. 5, 2004

(30) Foreign Application Priority Data

Jan. 31, 2003   (JP)   ............... 2003-023824

(51) Int. Cl.
*G06F 9/54* (2006.01)
*G06F 17/30* (2006.01)
(52) U.S. Cl. ...................... 719/318; 709/203
(58) Field of Classification Search ............ 719/318; 709/203
See application file for complete search history.

(56) References Cited

U.S. PATENT DOCUMENTS

| 6,415,284 B1 * | 7/2002 | D'Souza et al. ........... 707/3 |
| 2001/0022662 A1 * | 9/2001 | Hosoda .................... 358/1.9 |
| 2002/0063891 A1 | 5/2002 | Ueda et al. ............... 358/1.15 |
| 2002/0073146 A1 * | 6/2002 | Bauer et al. ............... 709/203 |
| 2003/0069943 A1 * | 4/2003 | Bahrs et al. ............... 709/219 |
| 2003/0072023 A1 * | 4/2003 | Tanaka .................... 358/1.13 |
| 2004/0205138 A1 * | 10/2004 | Friedman et al. ........... 709/206 |

FOREIGN PATENT DOCUMENTS

JP   2002-163596   6/2002

* cited by examiner

*Primary Examiner*—Meng-Ai An
*Assistant Examiner*—Abdou K Seye
(74) *Attorney, Agent, or Firm*—Fitzpatrick, Cella, Harper & Scinto

(57) ABSTRACT

In an information processing apparatus which performs a data process based on delivery data sent from an external information processing apparatus, it aims to enable to easily customize a data process to be performed by the information processing apparatus, e.g., an operation of an application program which has been already installed in the information processing apparatus. Moreover, it activates a program corresponding to the delivery data, thereby performing a process included in the activated program and corresponding to an event notification.

6 Claims, 8 Drawing Sheets

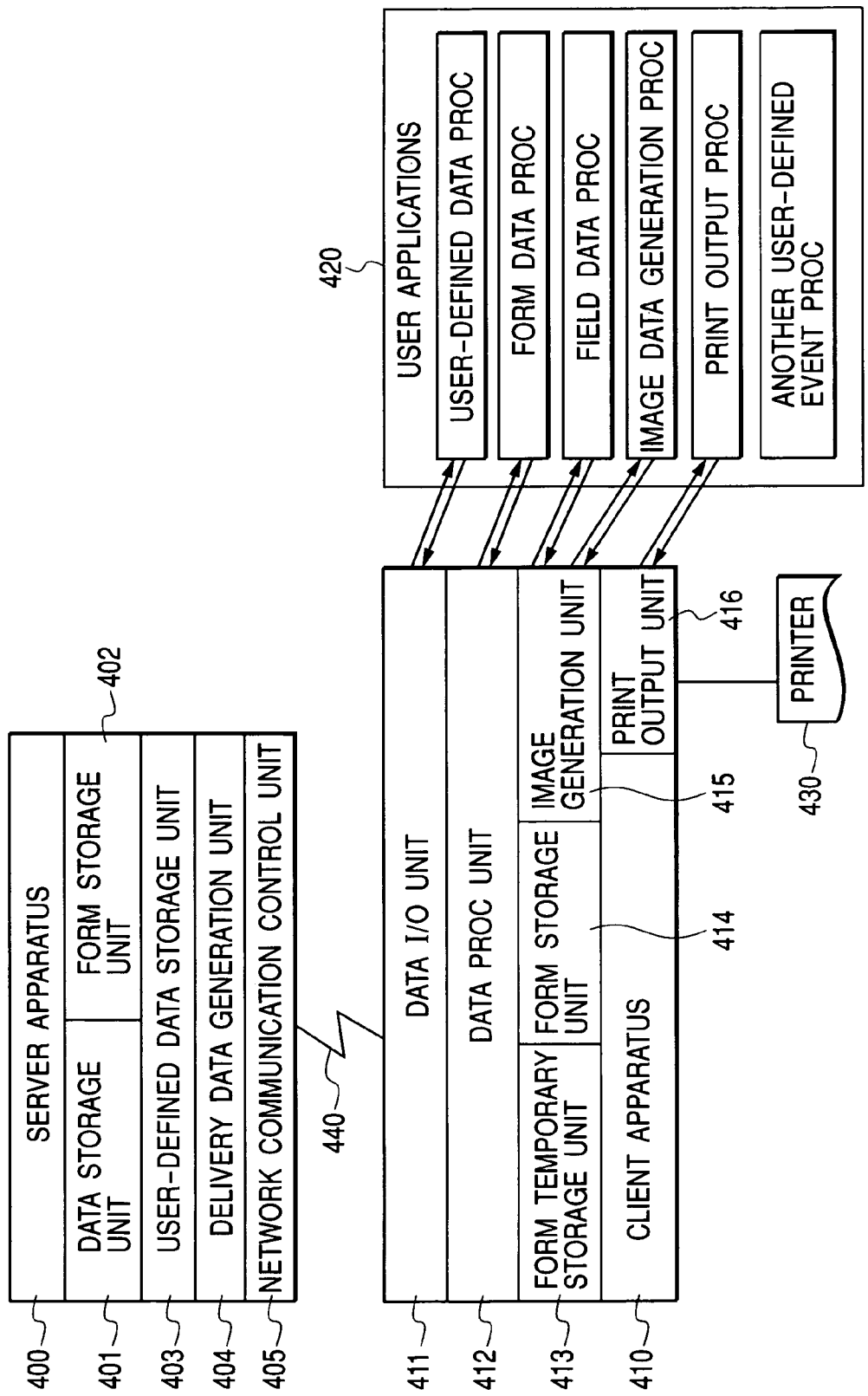

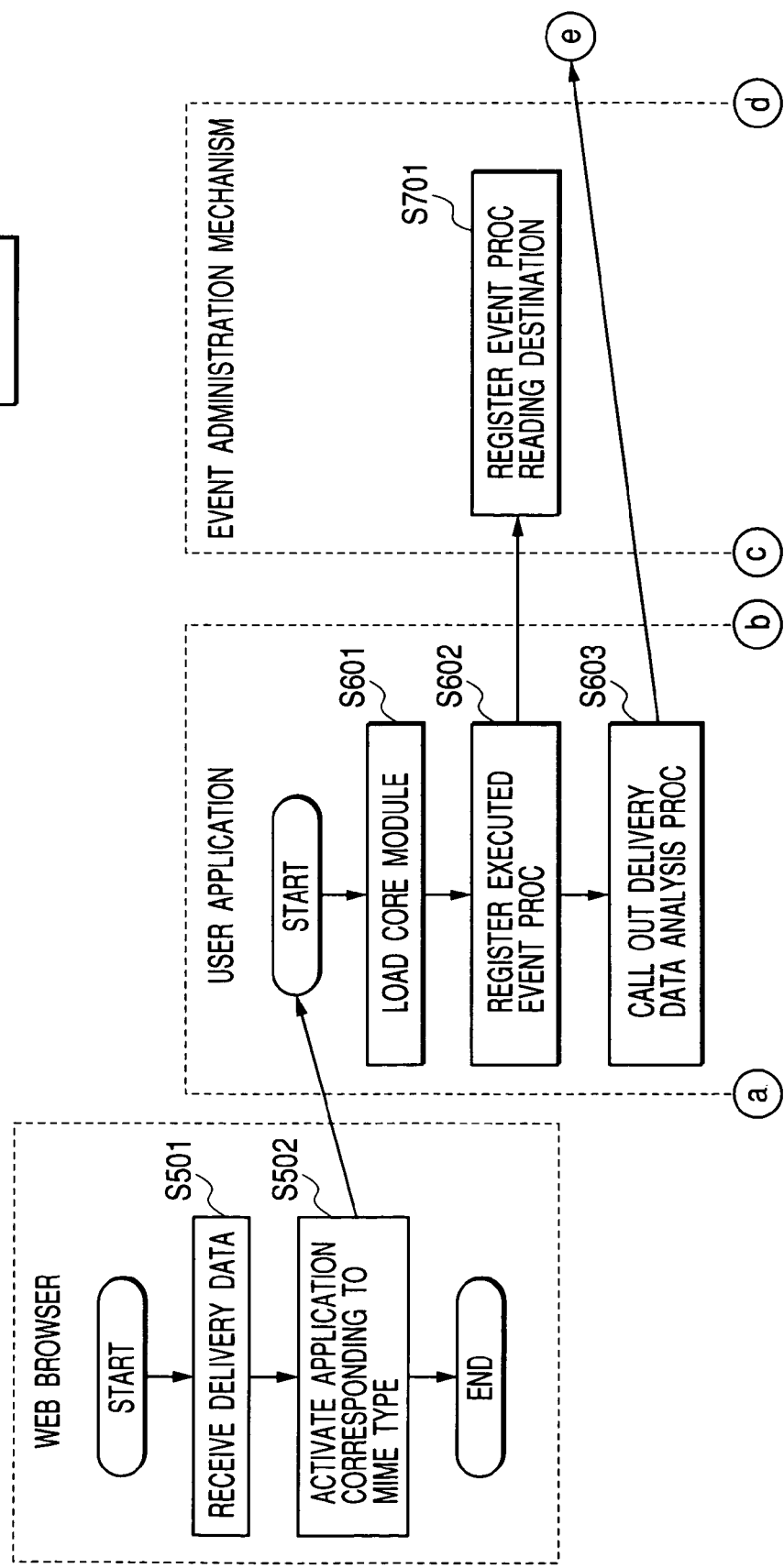

DATA PROCESSING METHOD, INFORMATION PROCESSING APPARATUS, AND PROGRAM

BACKGROUND OF THE INVENTION

1. Field of the Invention

The present invention relates to a data processing system in which a server apparatus transmits data to a client apparatus, and the client apparatus performs a data process on the basis of the data transmitted from the server apparatus. For example, the present invention relates to a print system in which the server apparatus transmits a form (or a business form) to the client apparatus, and the client apparatus prints the form transmitted by the server apparatus.

2. Related Background Art

Conventionally, a print system for performing an overlay process is proposed. Here, in the overlay process, form data (i.e., form template data) representing a form image (a business form, a business form template, or the like) and embedding data (i.e., field data) to be embedded in the form data are overlaid (or superposed), and the obtained data is generated as form image data. In the print system of this type, a server apparatus administrates the form data and the embedding data. That is, the server apparatus transmits the form data and the embedding data as delivery data to the client apparatus in response to a print request from the client apparatus. Then, the client apparatus performs the overlay process to the received delivery data, and actually prints the form based on the overlay-processed delivery data.

In the above print system, the client apparatus performs a display process and a print process on the basis of the delivery data transmitted from the server apparatus, according to control information. However, it is impossible to cause the client apparatus to perform a process which is not included or defined in the control information. Moreover, to cause the client apparatus to perform a new process, it is necessary to anew define such a new process in the control information and also remake a program for the client apparatus so that the client apparatus can cope with the newly defined process.

SUMMARY OF THE INVENTION

The present invention has been made in consideration of such a conventional problem, and an object thereof is to provide, so as to be able to flexibly customize a process to be performed on a client apparatus in a data processing system, a data processing method which delivers information necessary to perform a user-defined process from a server apparatus to the client apparatus, causes the client apparatus to detect the delivered information, and enables the client apparatus to call out the user-defined process from the detected delivered information, an information processing apparatus which adopts the data processing method, and a computer program which is used to achieve the data processing method.

BRIEF DESCRIPTION OF THE DRAWINGS

FIG. 4 is a view showing the functional structure of a network print system;

DETAILED DESCRIPTION OF THE PREFERRED EMBODIMENT

Figure 1:
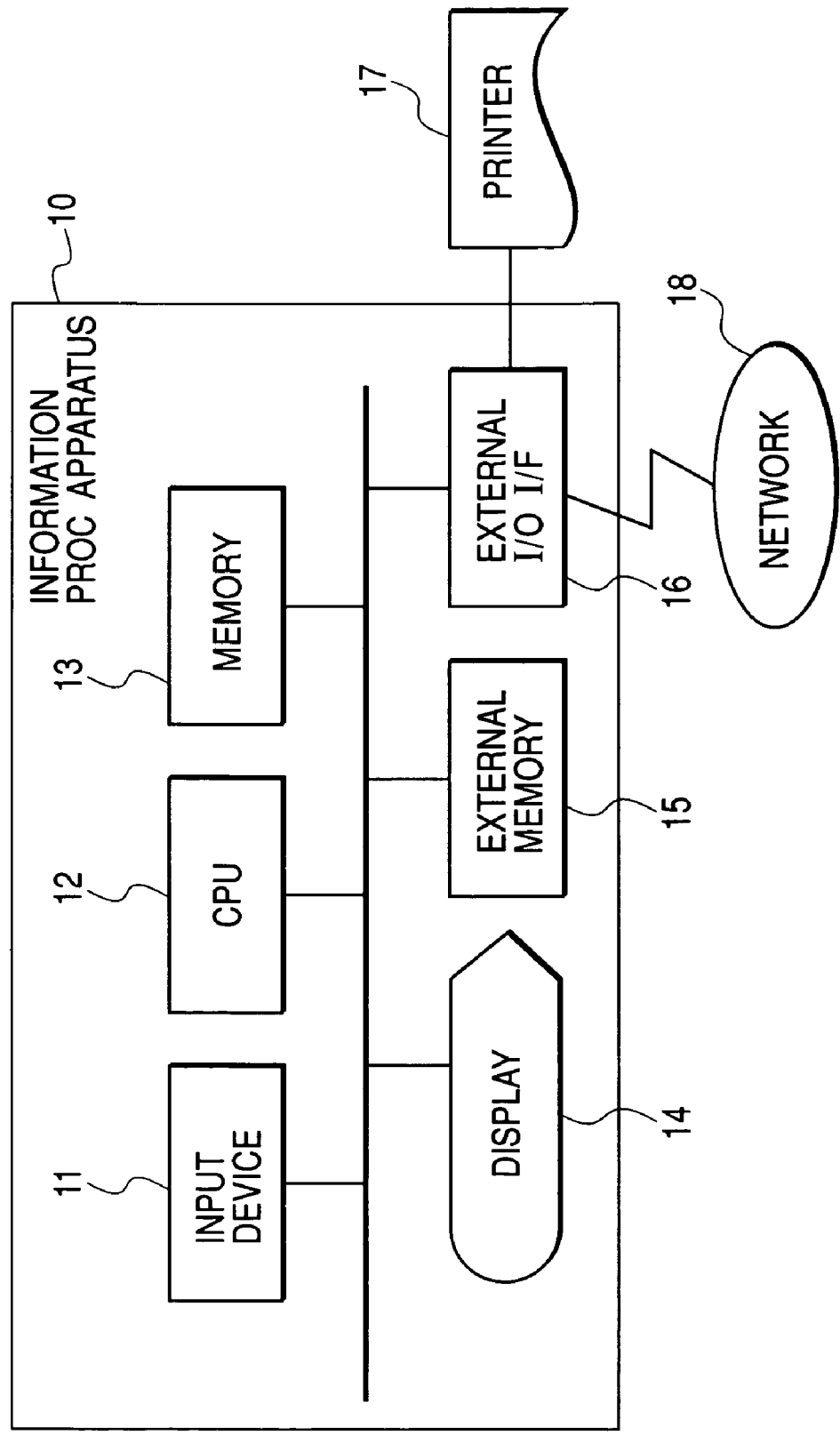
FIG. 1 is a block diagram showing the hardware structure of an information processing apparatus.

FIG. 1 is a block diagram showing the hardware structure of an information processing apparatus to be used in a data processing system according to the present invention.

An information processing apparatus 10 is composed of the following sections. That is, an input device 11 is a pointing device such as a keyboard, a mouse or the like. A CPU 12 being a central processing unit controls each of the sections and the processes to be executed in accordance with programs. A memory 13 is a main storage device such as a RAM, a ROM or the like. A display device 14 is a CRT display or the like. An external memory 15 is a storage medium drive (or a storage medium), a hard disk drive (or a hard disk) or the like. An external input/output interface (I/O I/F) 16 which is used to connect with an external network 18 is, for example, a network interface card or the like. A printing device 17 is an image processing apparatus such as a printer, a copying machine, a complex machine, a facsimile apparatus or the like.

The information processing apparatus starts to operate after the CPU performs a data process in accordance with a basic I/O program, an operating system (OS) and other programs. The basic I/O program is stored in the memory 13, and the OS is stored in the external memory 15. When the power of the information processing apparatus is turned on, the OS is read out from the external memory 15 into the memory 13 by an initial program loading (IPL) function in the basic I/O program and then a process by the OS is started.

Figure 2:
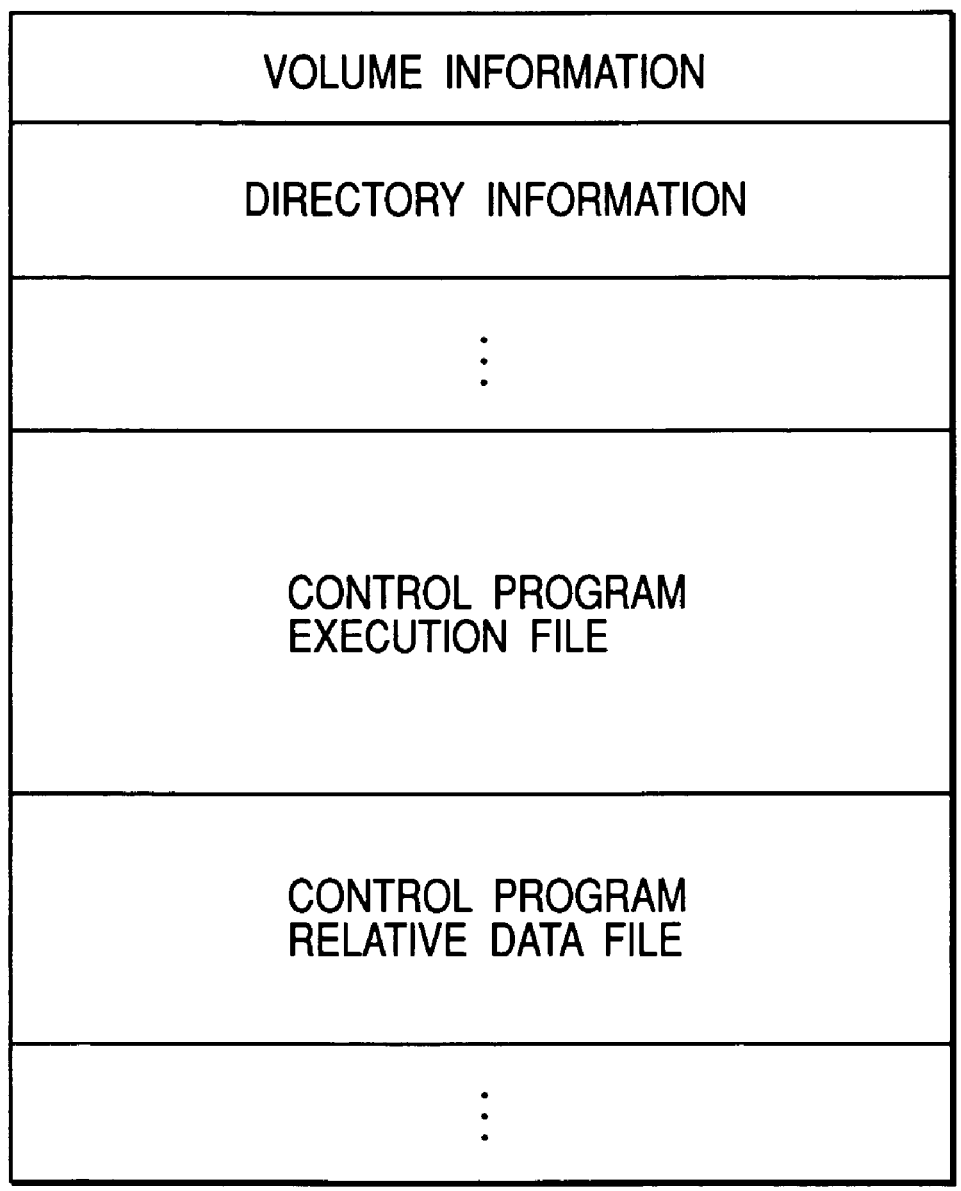
FIG. 2 is a view showing the contents of a storage medium storing a control program and relative data thereof.

FIG. 2 is a view showing the contents of a storage medium storing a control program and relative data thereof according to the present invention. Volume information, directory information, a control program execution file and a control program relative data file are stored in the storage medium. The control program and the relative data thereof are loaded into the information processing apparatus through the storage medium drive. When a user inserts the storage medium into the storage medium drive, the control program and the relative data thereof are read out from the storage medium under the control of the OS and the basic I/O program to be loaded into the memory 13. Thus, a process according to the control program can be executed.

Figure 3:
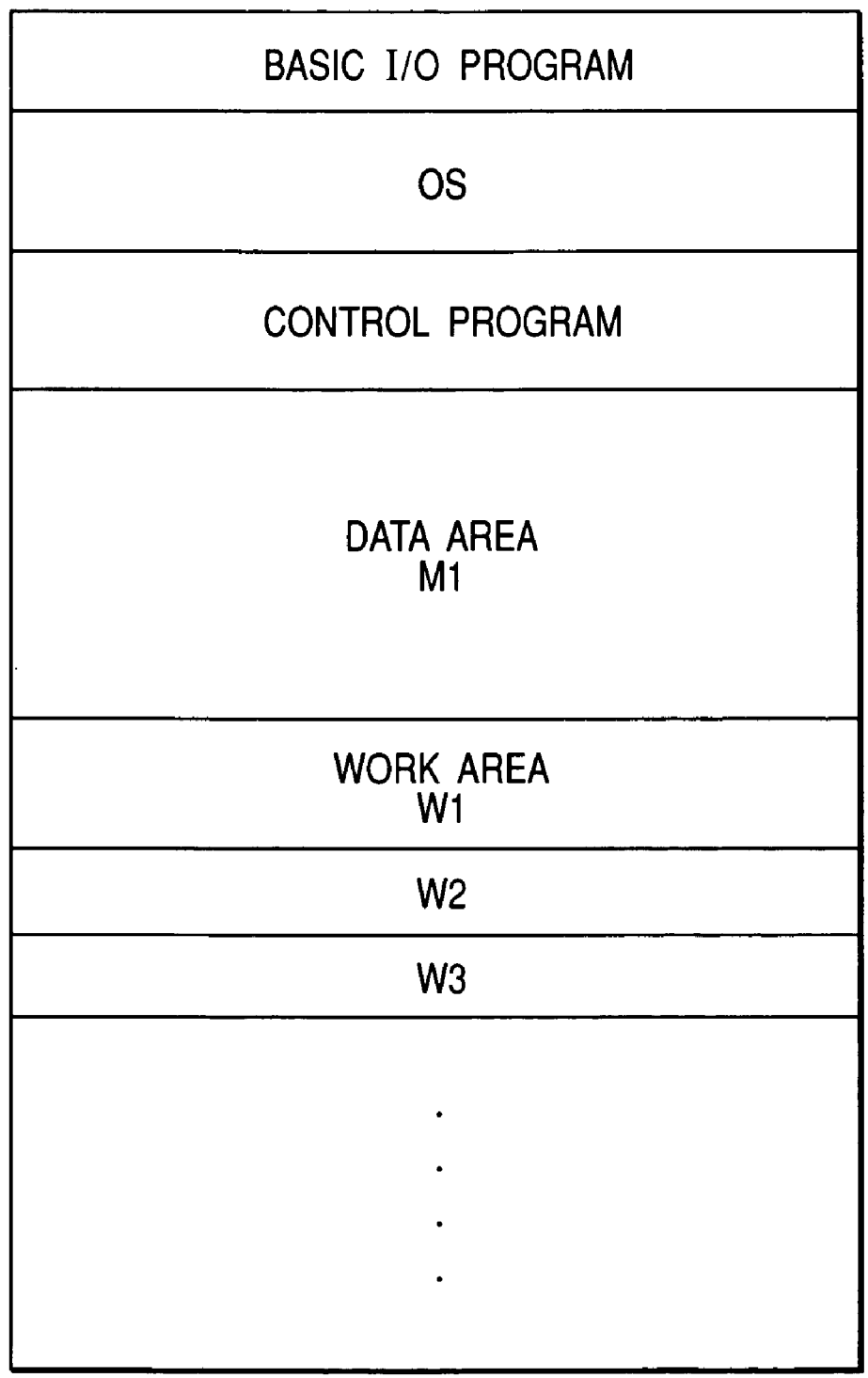
FIG. 3 is a view showing a memory map of a memory 13.

FIG. 3 is a view showing a memory map of the memory 13. As shown in FIG. 3, the basic I/O program, the OS and the control program are loaded into the memory 13. Further, a data area M1, work areas W1 to W3 are secured in the memory 13.

Although it was explained that the control program and the relative data thereof are directly loaded into the memory 13 from the storage medium, it may be constituted that the control program and the relative data thereof are once stored into a hard disk from the storage medium and then they are loaded into the memory 13. The storage medium may be a Floppy Disk™, a CD-ROM, a DVD-ROM, an IC card memory or the like. Further, a ROM in which the control program is stored may be provided in the information processing apparatus.

Hereinafter, a data processing system (i.e., a network print system) according to the present invention will be explained. FIG. 4 is a view showing the functional structure of the network print system.

A server apparatus 400 is an information processing apparatus having the function of a Web server. The server apparatus 400 has the following function units. That is, a data storage unit 401, which corresponds to a data base or the like, stores data necessary for business. The data stored in the data storage unit 401 is used as field data to be described later. A form (or a business form) storage unit 402 stores form data (or form template data) necessary for generating form image data when a form print is performed. A user-defined data storage unit 403 stores later-described user-defined data.

A delivery data generation unit 404 generates data necessary for generating image data and delivery data including the form data on the basis of a request from a client apparatus. There sometimes is a case that delivery data including the image data is generated upon generating the image data by synthesizing the data stored in the data storage unit 401 and the form data. A network communication control unit 405 performs the function of the Web server and controls a network communication.

A client apparatus 410 is an information processing apparatus such as a personal computer (PC) or the like. The client apparatus 410 has the following function units. That is, a data input/output (I/O) unit 411 performs input and output of data for the server apparatus 400 and has the function of a Web browser. A data processing unit 412 analyzes the delivery data and reconstructs data necessary for generating the image data, the field data, the form data and the like.

A form temporary storage unit 413 stores the form data reconstructed by the data processing unit 412. A form storage unit 414 stores the form data. An image generation unit 415 generates image data by synthesizing the form data and the field data in accordance with a predetermined pattern. The generated image data indicates a form image. A print output unit 416 converts the image data generated by the image generation unit 415 into a data format which can be processed by a printer 430, and is generally constituted by a program called a printer driver.

A network 440 is a communication medium which enables the server apparatus 400 to communicate with the client apparatus 410. As the network 440, a LAN, an Internet, a radio expedient or the like can be used, and it is desirable that the above network matches with a communication procedure under Web environments.

Incidentally, user applications 420 which are activated by the client apparatus 410 executes a process based on the delivery data cooperating with a core module to be described later. The user applications 420 execute a user-defined data process, a form data process, a field data process, an image data generation process, a print output process and another user-defined event process in accordance with an issued event.

Figure 5B:
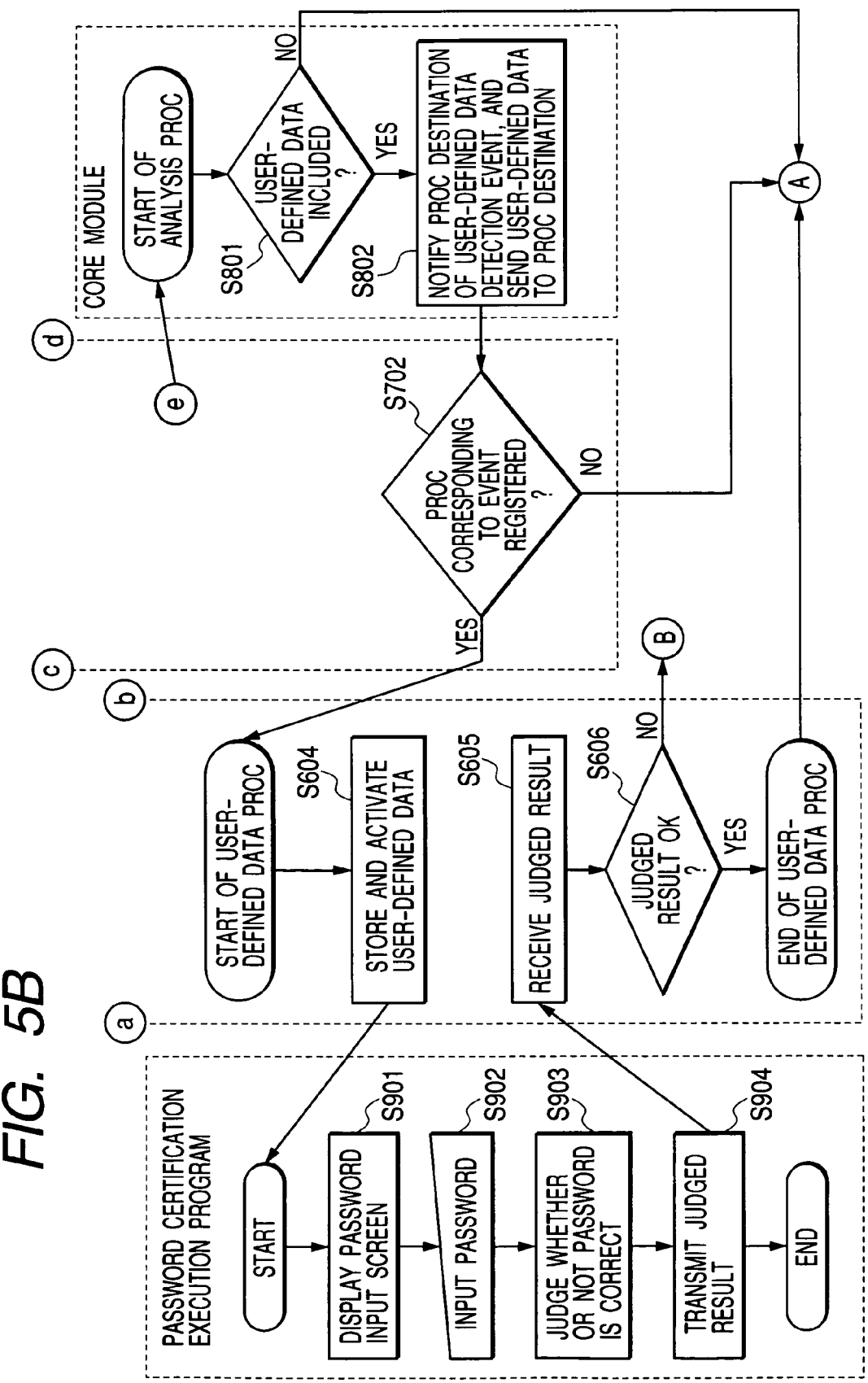
FIG. 5 is comprised of FIGS. 5A and 5B showing flowcharts illustrating a process flow.

FIG. 5 is comprised of FIGS. 5A and 5B showing flowcharts illustrating a flow of a more concrete process.

In this process, the user applications 420 are formed by an execution format file (EXE) and the core module is constituted as a dynamic link library format component. Further, a password certification execution program (password.exe) is embedded as the user-defined data in the delivery data by the server apparatus 400.

When a web server of the client apparatus 410 accesses to a web page in which information used for issuing a form is embedded, the delivery data is transmitted from the server apparatus 400 to the client apparatus 410 (step S501). When the delivery data is received, the web browser activates an execution program corresponding to the MINE type registration of the delivery data (step S502).

In the present embodiment, the user applications are previously installed in the client apparatus 410 to be associated with the MINE type of the delivery data. Accordingly, the user applications 420 are activated.

When the user applications 420 are activated, the core module is initially loaded (step S601). In the core module, a delivery data analysis process for analyzing the delivery data, a form display process and a form printing process are installed. When the loading of the core module ends, all the event processes executed to the user applications are successively registered in the core module (step S602). On the other hand, in an event administration mechanism of the core module, an event and an event process reading destination (program) corresponding to the event are correspondingly registered (step S701). In the present embodiment, the included event process is an event process (user-defined data detection event) of detecting the user-defined data.

After registering the event process, the user application calls out the delivery data analysis process of the core module (step S603). Thereupon, a control process is shifted within the core module and then an analysis process of the delivery data is started.

In the first of the analysis process of the delivery data, it is judged whether or not the user-defined data is included in the delivery data (step S801). If it is judged that the user-defined data is included, the core module issues a user-defined data detection event and sends the user-defined data to a processing destination (step S802). The event administration mechanism recognizes that the user-defined data detection event was issued and judges whether or not the user-defined data detection event is registered. If the user-defined data detection event is registered, an event process corresponding to the user-defined data detection event is judged (step S702). In these steps, a program corresponding to the user-defined data detection event is assumed as the user application.

In a case where the user-defined data detection event is registered and the user application corresponds to the user-defined data detection event, the user-defined data is sent to the user application and then a control process is shifted to the user-defined data process within the user application. In the user-defined data process, it is recognized that the user-defined data is an execution program. This condition depends on a fact that the specification between a developer of an embedding process of the user-defined data and a developer of the user application is predetermined. Therefore, a title is given to the user-defined data to store it as a file (password.exe) and then the user-defined data is activated (step S604).

In the present embodiment, since the file "password.exe" is embedded as the user-defined data, the password certification execution program (password.exe) is activated. The password certification execution program initially displays a screen of requiring an input of the password (step S901).

When a user inputs the password (step S902), it is judged whether or not the password is correct (step S903) and then the judged result is sent to the user application (step S904). In this time, a process of sending a true/false value as an end code to an original activation parent program is executed.

Figures 6, 6A:
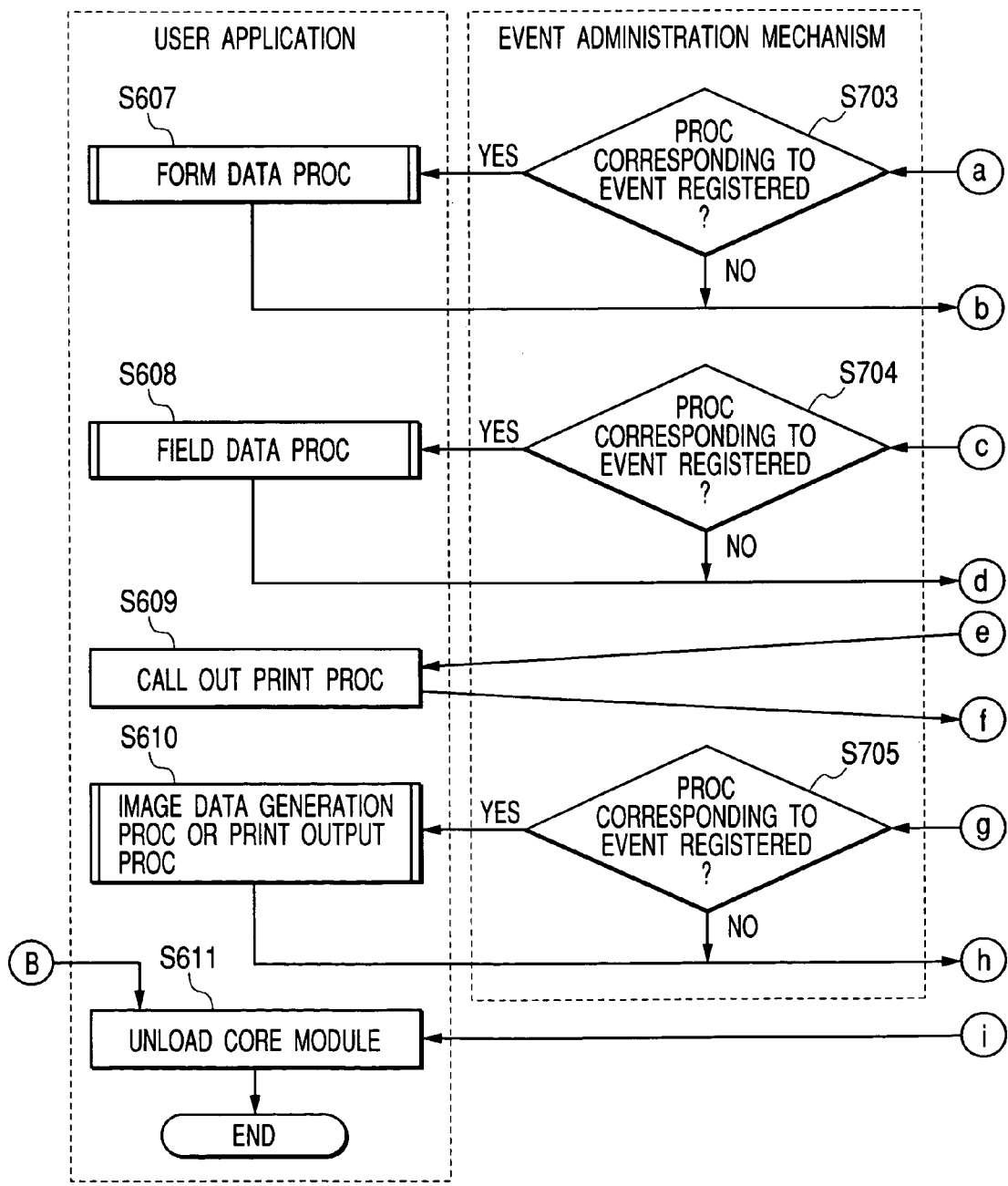
FIG. 6 is comprised of FIGS. 6A and 6B showing flowcharts illustrating another process flow.
Figure 6B:
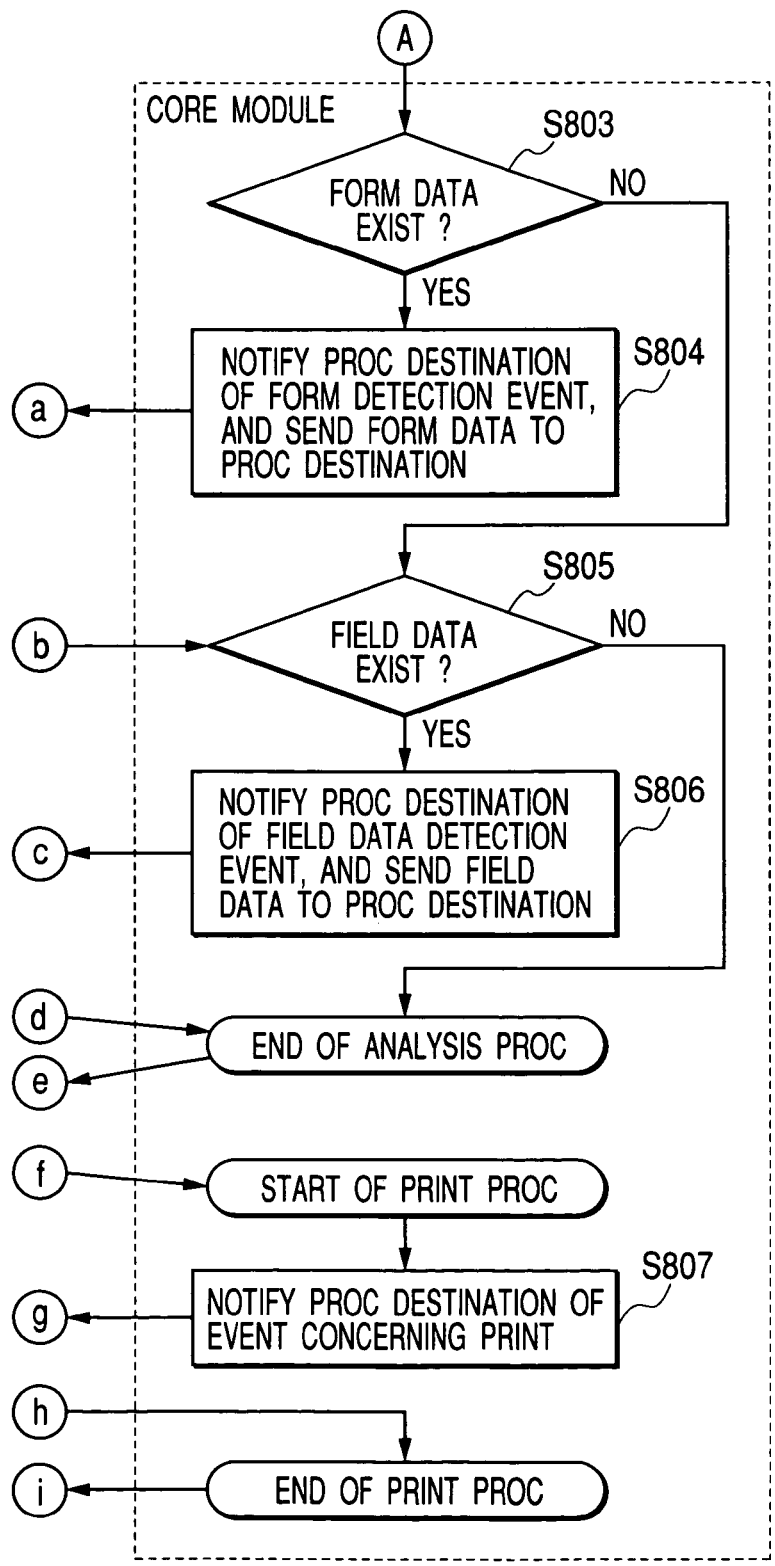

In the user-defined data process, the judged result is received (step S605), and the contents of the judged result is judged (step S606). When the user inputs a correct password (in a case that an end code is "TRUE"), the user-defined data process ends, and then a control process is sent to the core module. When the user inputs an incorrect password (in a case that an end code is "FALSE"), a flow advances to a step S611 shown in FIG. 6A.

Subsequently, it is judged whether or not the form data is included in the delivery data (step S803). If the form data is included, a form data detection event is notified and then the form data is sent to a processing destination (step S804). The event administration mechanism judges whether or not the form data detection event is registered, and if the form data detection event is registered, an event process corresponding to the form data detection event is judged (step S703). In a case where the form data process is registered corresponding to the form data detection event, the form data process is executed (step S607).

Similarly, it is judged whether or not the field data is included in the delivery data (step S805). The field data is such data which is synthesized on a predetermined position of the form data. If the field data is included, a field data detection event is notified and then the field data is sent to a processing destination (step S806). The event administration mechanism judges whether or not the field data detection event is registered, and if the field data detection event is registered, an event process corresponding to the field data detection event is judged (step S704). In a case where the field data process is registered corresponding to the field data detection event, the field data process is executed (step S608).

When an analysis process ends, a control process is shifted from the core module to the user application. Thereupon, the user application calls out a print process of the core module (step S609). Then, the print process of the core module is started.

In the print process, an event concerning a previously defined print is issued (step S807). The event administration mechanism judges whether or not the issued event is registered, and if the issued event is registered, an event process corresponding to the issued event is judged. As for the event process, there is an image data generation process or a print output process (step S610). The image data generation process causes the image generation unit 415 to generate image data by controlling the image generation unit 415. The print output process causes the print output unit 416 to transmit print data to the printer 430 by controlling the print output unit 416.

When a print process ends, a control process is shifted from the core module to the user application, the user application unloads the core module (step S611), and then the process ends.

As explained in the foregoing wherein the "password.exe" was activated, various programs can be activated in the client apparatus by designating an execution program by using the user-defined data. This fact is an example of indicating flexibility of a system which can be realized by the present invention.

That is, as to the application software once forwarded and distributed, an operation of the application software installed in lots of client apparatuses can be customized after forwarding and distributing the application software.

According to the present invention, in an information processing apparatus which executes a data process on the basis of data from an external information processing apparatus, with respect to the data process to be executed in the information processing apparatus, for example, an operation of the application program already installed in the information processing apparatus can be easily customized.

In an information processing apparatus which executes a print process on the basis of data from the external information processing apparatus, with respect to the data process to be executed in the information processing apparatus, for example, an operation of the application program already installed in the information processing apparatus can be easily customized for the print process.

In the information processing apparatus which executes the data process on the basis of data from the external information processing apparatus, even if a program used for certifying a password is not provided in the information processing apparatus, with respect to the data process to be executed in the information processing apparatus, for example, a password certification can be executed by customizing an operation of the application program already installed in the information processing apparatus.

What is claimed is:

1. A data processing method, which is executed in an information processing apparatus, for performing a data process based on delivery data transmitted from an external information processing apparatus, the method comprising:

a reception step of receiving the delivery data transmitted from the external information processing apparatus;

a first judgment step of judging whether particular data is included in the delivery data, by analyzing the delivery data received in the reception step;

an issuance step of issuing a particular data detection event indicating that the particular data is included, in a case where it is judged in the first judgment step that the particular data is included in the delivery data;

an event management step of registering an event and a program corresponding to the event;

a second judgment step of judging whether the particular data detection event issued by the issuance step has been registered by the event management step;

a control step for, in a case where it is judged by the second judgment step that the particular data detection event has been registered, giving the particular data to the corresdonding program and executing the data process;

an activation step for, in a case where the particular data is an executable program as a result of the data process executed by the control step, activating the executable program;

a third judgment step of judging whether other particular data is included in the delivery data, by analyzing the delivery data received in the reception step;

a second issuance step of issuing another particular data detection event indicating that the other particular data is included, in a case where it is judged in the third judgment step that the other particular data is included in the delivery data;

a second control step for, in a case where it is judged by the third judgment step that the other particular data detection event has been registered, giving the other particular data to the corresponding program and executing the data process; and a second activation step for, in a case where the other particular data is an executable program as a result of the data process executed by the second control step, activating the executable program, wherein the particular data is form data, and the data process corresponding to the other particular data detection event issued in the second issuance step is a form data process.

2. A data processing method according to claim 1, which is executed in an information processing apparatus, for performing a data process based on delivery data transmitted from an external information processing apparartus, the method comprising:

a reception step of receiving the delivery data transmitted from the external information processing appararus;

a first judgment step of judging whether particular data is included in the delivery data, by analyzing the delivery data received in the reception step;

an issuance step of issuing a particular data detection event indicating that the particular data is included, in a case where it is judged in the first judgment step that the particular data is included in the delivery data;

an event management step of registering an event and a program corresponding to the event;

a second judgment step of judging whether the particular data detection event issued by the issuance step has been registered by the event management step;

a control step for, in a case where it is judged by the second judgment step that the particular data detection event has been registered, giving the particular data to the corresponding program and executing the data process;

an activation step for, in a case where the particular data is an executable program as a result of the data process executed by the control step, activating the executable program;

a third judgment step of judging whether other particular data is included in the delivery data, by analyzing the delivery data received in the reception step;

a second issuance step of issuing another particular data detection event indicating that the other particular data is included, in a case where it is judged in the third judgment step that the other particular data is included in the delivery data;

a second control step for, in a case where it is judged by the third judgment step that the other particular data detection event has been registered, giving the other particular data to the corresponding program and executing the data process; and a second activation step for, in a case where the other particular data is an executable program as a result of the data process executed by the second control step, activating the executable program, wherein the particular data is field data, and the data process corresponding to the other particular data detection event issued in the second issuance step is a field data process.

3. An information processing apparatus that includes a central processing unit for performing a data process based on delivery data transmitted from an external information processing apparatus, the information processing apparatus comprising:

a reception unit configured to receive the delivery data transmitted from the external information processing apparatus;

a first judgment unit configured to judge whether particular data is included in the delivery data, by analyzing the delivery data received by the reception unit;

an issuance unit configured to issue a particular data detection event indicating that the particular data is included, in a case where it is judged by the first judgment unit that the particular data is including in the delivery data;

an event management unit configured to register an event and a program corresponding to the event;

a second judgment unit configured to judge whether the particular data detection event issued by the issuance unit has been registered by the event management unit;

a control unit configured to cause, in a case where it is judged by the second judgment unit that the particular data detection event has been registered, to give the particular data to the corresponding program and execute the data process;

an activation unit configured to, in a case where the particular data is an executable program as a result of the data process executed by the control unit, activate the executable program;

a third judgment unit configured to judge whether other particular data is included in the delivery data, by analyzing the delivery data received by the reception unit;

a second issuance unit configured to issue another particular data detection event indicating that the other particular data is included, in a case where it is judged by the third judgment unit that the other particular data is included in the delivery data;

a second control unit configured to, in a case where it is judged by the third judgment step that the other particular data detection event has been registered, giving the other particular data to the corresponding program and executing the data process; and a second activation unit configured to, in a case where the other particular data is an executable program as a result of the data process executed by the second control step, activating the executable program, wherein the particular data is form data, and the data process corresponding to the particular data detection event issued by the issuance unit is a form data process.

4. An information processing apparatus that includes a central processing unit for performing a data process based on delivery data transmitted from an external information processing apparatus, the information processing apparatus comprising:

a reception unit configured to receive the delivery data transmitted from the external information processing apparatus;

a first judgment unit configured to judge whether particular data is included in the delivery data, by analyzing the delivery data received by the reception unit;

an issuance unit configured to issue a particular data detection event indicating that the particular data is included, in a case where it is judged by the first judgment unit that the particular data is including in the delivery data;

an event management unit configured to register an event and a program corresponding to the event;

a second judgment unit configured to judge whether the particular data detection event issued by the issuance unit has been registered by the event management unit;

a control unit configured to cause, in a case where it is judged by the second judgment unit that the particular data detection event has been registered, to give the particular data to the corresponding program and execute the data process;

an activation unit configured to, in a case where the particular data is an executable program as a result of the data process executed by the control unit, activate the executable program;

a third judgment unit configured to judge whether other particular data is included in the delivery data, by analyzing the delivery data received by the reception unit;

a second issuance unit configured to issue another particular data detection event indicating that the other particular data is included, in a case where it is judged by the third judgment unit that the other particular data is included in the delivery data;

a second control unit configured to, in a case where it is judged by the third judgment step that the other particular data detection event has been registered, giving the other particular data to the corresponding program and executing the data process; and a second activation unit configured to, in a case where the other particular data is an executable program as a result of the data process executed by the second control step, activating the executable program, wherein the particular data is field data, and the data process corresponding to the particular data detection event issued by the issuance unit is a field data process.

5. A computer-readable storage medium that stores program codes for executing a data processing method, the method comprising:
- a reception step of receiving the delivery data transmitted from the external information processing apparatus;
- a first judgment step of judging whether or not particular data is included in the delivery data, by analyzing the delivery data received in the reception step;
- an issuance step of issuing a particular data detection event indicating that the particular data is included, in a case where it is judged in the first judgment step that the particular data is included in the delivery data;
- an event management step of registering an event and a program corresponding to the event;
- a second judgment step of judging whether the particular data detection event issued by the issuance step has been registered by the event management step;
- a control step for, in a case where it is judged by the second judgment step that the particular data detection event has been registered, giving the particular data to the corresponding program and executing the data process;
- an activation step configured to, in a case where the particular data is an executable program as a result of the data process executed by the control step, activating the executable program;
- a third judgment step of judging whether other particular data is included in the delivery data, by analyzing the delivery data received in the reception step;
- a second issuance step of issuing another particular data detection event indicating that the other particular data is included, in a case where it is judged in the third judgment step that the other particular data is included in the delivery data;
- a second control step for, in a case where it is judged by the third judgment step that the other particular data detection event has been registered, giving the other particular data to the corresponding program and executing the data process; and
- a second activation step for, in a case where the other particular data is an executable program as a result of the data process executed by the second control step, activating the executable program,
- wherein the particular data is form data, and the data process corresponding to the other particular data detection event issued in the second issuance step is a form data process.

6. A computer-readable storage medium that stores program codes for executing a data processing method, the method comprising:
- a reception step of receiving the delivery data transmitted from the external information processing apparatus;
- a first judgment step of judging whether or not particular data is included in the delivery data, by analyzing the delivery data received in the reception step;
- an issuance step of issuing a particular data detection event indicating that the particular data is included, in a case where it is judged in the first judgment step that the particular data is included in the delivery data;
- an event management step of registering an event and a program corresponding to the event;
- a second judgment step of judging whether the particular data detection event issued by the issuance step has been registered by the event management step;
- a control step for, in a case where it is judged by the second judgment step that the particular data detection event has been registered, giving the particular data to the corresponding program and executing the data process;
- an activation step configured to, in a case where the particular data is an executable program as a result of the data process executed by the control step, activating the executable program;
- a third judgment step of judging whether other particular data is included in the delivery data, by analyzing the delivery data received in the reception step;
- a second issuance step of issuing another particular data detection event indicating that the other particular data is included, in a case where it is judged in the third judgment step that the other particular data is included in the delivery data;
- a second control step for, in a case where it is judged by the third judgment step that the other particular data detection event has been registered, giving the other particular data to the corresponding program and executing the data process; and
- a second activation step for, in a case where the other particular data is an executable program as a result of the data process executed by the second control step, activating the executable program,
- wherein the particular data is field data, and the data process corresponding to the other particular data detection event issued in the second issuance step is a field data process.

* * * * *